(12) United States Patent
Olgaard et al.

(10) Patent No.: US 8,391,160 B2
(45) Date of Patent: Mar. 5, 2013

(54) SYSTEM AND METHOD FOR USING MULTIPLE NETWORK ADDRESSES TO ESTABLISH SYNCHRONIZATION OF A DEVICE UNDER TEST AND TEST EQUIPMENT CONTROLLING THE TEST

(75) Inventors: Christian Volf Olgaard, Saratoga, CA (US); Ray Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 328 days.

(21) Appl. No.: 12/791,594

(22) Filed: Jun. 1, 2010

(65) Prior Publication Data

US 2011/0292809 A1    Dec. 1, 2011

(51) Int. Cl.
*H04J 1/16* (2006.01)

(52) U.S. Cl. ....................................................... 370/241

(58) Field of Classification Search .................. 370/241, 370/246, 242, 243, 245, 249, 274, 293, 315, 370/492, 503, 501, 505
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,003,535 A * | 3/1991 | May et al. | 370/514 |
| 5,138,608 A | 8/1992 | Kucera et al. | |
| 5,910,977 A | 6/1999 | Torresgrossa | |
| 6,052,362 A * | 4/2000 | Somer | 370/246 |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,463,140 B2 | 12/2008 | Schmidt | |
| 7,564,893 B2 | 7/2009 | O'Neill | |
| 7,680,802 B2 * | 3/2010 | Kato | 455/3.05 |
| 7,890,822 B2 | 2/2011 | Behziz et al. | |

FOREIGN PATENT DOCUMENTS

| | | |
|---|---|---|
| KR | 10-2005-0012570 A | 2/2005 |
| KR | 10-2006-0093693 A | 8/2006 |
| KR | 10-2009-0091171 A | 8/2009 |

OTHER PUBLICATIONS

International Search Report and Written Opinion for PCT/US2011/036793, dated Dec. 21, 2011; 8 pages.
International Preliminary Report on Patentability Dated Dec. 4, 2012 for PCT/US2011/036793; 4 Pages.

* cited by examiner

*Primary Examiner* — Chi Pham
*Assistant Examiner* — Alexander O Boakye

(57) ABSTRACT

A system and method for testing a data packet signal transceiver in which multiple network addresses (e.g., media access control, or MAC, addresses) are used to establish synchronization of the device under test and the test equipment controlling the test. In accordance with an exemplary embodiment, synchronization is established using a first MAC address, following which testing is conducted using a second MAC address.

34 Claims, 4 Drawing Sheets

SYSTEM AND METHOD FOR USING MULTIPLE NETWORK ADDRESSES TO ESTABLISH SYNCHRONIZATION OF A DEVICE UNDER TEST AND TEST EQUIPMENT CONTROLLING THE TEST

BACKGROUND OF THE INVENTION

1. Field of the Invention

The present invention relates to systems and methods for testing wireless devices that requires synchronization of test equipment and wireless device as part of the test sequence.

2. Related Art

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, all of these wireless-connectivity capabilities (e.g., WiFi, WiMAX, Bluetooth, etc.) are defined by industry-approved standards (e.g., IEEE 802.11 and IEEE 802.16) which specify the parameters and limits to which devices having those connectivity capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals, and to send signals that subscribe to industry-approved standards so as to determine whether a device is receiving and processing the wireless signals in accordance with its standard.

The testing environment consists of the device, the tester, and a computer controller. The computer and tester work together to capture a device's transmitted signal then analyze it against the specifications provided by the underlying standard; and to send tailored signals to the device to test its receiver capabilities against the specifications of the underlying standard.

A problem that a developer faces in many of today's wireless devices (e.g., cell phones), there is no direct way to control the wireless sub-blocks of the device. In order to control a wireless sub-block one will need to issue a command to the device's CPU which in turn issues a corresponding command to the wireless sub-system. This type of control can increase test time as such communication can be inefficient.

Methods to address this have been proposed (e.g., U.S. Pat. No. 7,689,213, the disclosure of which is incorporated herein by reference). In this type of system the test instrument and wireless system follow a predefined test sequence. For this predefined test sequence to work, the test instrument and wireless system must be synchronized such that the two devices know what the other is to do next.

An issue can arise concerning synchronization in the wireless system which can cause problems for reliable implementation of the above discussed test methodology. This can occur if the software inside the wireless subsystem causes a time delay between issuing a command and when results can be obtained. This delay, in turn, can cause the two systems to go out of sync, as the test equipment is basically sending packets that the wireless sub-system is not observing or receiving. Accordingly, it would be desirable to have a system and method to implement reliable synchronization within systems exhibiting a delay in issuing commands.

SUMMARY OF THE INVENTION

In accordance with the presently claimed invention, a system and method for testing a data packet signal transceiver in which multiple network addresses (e.g., media access control, or MAC, addresses) are used to maintain synchronization of the device under test and the test equipment controlling the test. In accordance with an exemplary embodiment, synchronization is established using a first MAC address, following which testing is conducted using a second MAC address.

In accordance with one embodiment of the presently claimed invention, a method of testing a data packet signal transceiver includes:

receiving, with a data packet signal transceiver via a first one of a plurality of network addresses, one or more first data packets, wherein the data packet signal transceiver is adapted to communicate via the plurality of network addresses;

transmitting, with the data packet signal transceiver, at least one first acknowledgment signal indicating reception of at least one of the one or more first data packets;

following reception with the data packet signal transceiver of a predetermined number of the one or more first data packets, receiving, with the data packet signal transceiver via a second one of the plurality of network addresses, one or more second data packets; and transmitting with the data packet signal transceiver at least one second acknowledgment signal indicating reception of at least one of the one or more second data packets.

In accordance with another embodiment of the presently claimed invention, a method of testing of a data packet signal transceiver includes:

transmitting, for reception by a data packet signal transceiver via a first one of a plurality of network addresses, one or more first data packets, wherein the data packet signal transceiver is adapted to communicate via the plurality of network addresses;

receiving, from the data packet signal transceiver, at least one first acknowledgment signal indicating reception of at least one of the one or more first data packets;

following reception of a predetermined number of the at least one first acknowledgment signal, transmitting, for reception by the data packet signal transceiver via a second one of the plurality of network addresses, one or more second data packets; and receiving, from the data packet signal transceiver, at least one second acknowledgment signal indicating reception of at least one of the one or more second data packets.

In accordance with still another embodiment of the presently claimed invention, an apparatus including a tester for testing a data packet signal transceiver includes:

a transmitter for transmitting, for reception by a data packet signal transceiver via a first one of a plurality of network addresses, one or more first data packets, wherein the data packet signal transceiver is adapted to communicate via the plurality of network addresses, and following reception, from the data packet signal transceiver, of a predetermined number of at least one first acknowledgment signal, transmitting, for reception by the data packet signal transceiver via a second one of the plurality of network addresses, one or more second data packets; and a receiver for receiving the at least one first acknowledgment signal indicating reception of at least one of the one or more first data packets, and receiving, from the data packet signal transceiver, at least one second acknowledgment signal indicating reception of at least one of the one or more second data packets.

DETAILED DESCRIPTION

Figure 1:
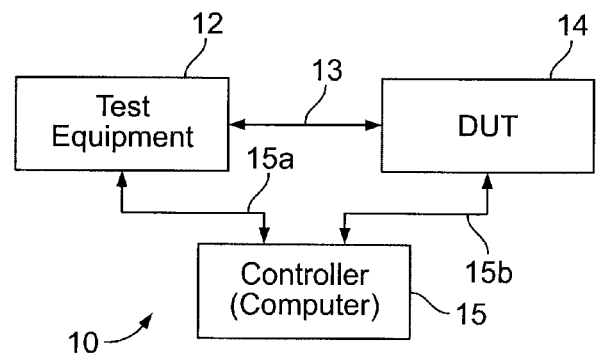
FIG. 1 depicts a conventional test setup with a device under test (DUT) connected to test equipment (a tester) using a cable.

The following detailed description is of example embodiments of the presently claimed invention with references to the accompanying drawings. Such a description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawing, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implements using one or more appropriately programmed processors, depending upon the signal frequencies or data rates to be processed.

As discussed in more detail below, the presently claimed invention provides a system and method for using multiple network addresses, e.g., device identifiers in the form of media access control (MAC) addresses, in the DUT to allow the system to differentiate between different data packets and commands used for synchronization and for actual testing. As a result, the test equipment can more easily control the packet generation and, by using multiple identifiers, the method ensures only test-oriented packets are taken into account in the test results, thereby addressing a problem that can occur in multiple DUTs. While the following discussion is in the context of an IEEE 802.11 system, it will be readily understood by one of ordinary skill in the art that what is presented will apply to other wireless as well as wired system standards.

Once a DUT receives a data packet and it is received as a good packet, an acknowledgement signal (e.g., ACK) is generated. In an 802.11 system this is usually hardware generated to save processor time and to optimize throughput of the overall system. Other standards, such as Bluetooth, can, while in a test mode, be in a state where it loops back the received packet with the packet containing an exact (bit-wise) representation of the received data. Although these responses may appear dissimilar, for purposes of the present discussion they are similar in that a packet is generated in response to reception of a transmitter packet. This allows the test equipment to know that the DUT has received the packet and is ready for testing. It can be further used to synchronize the tester and DUT.

Referring to FIG. 1, a conventional test environment 10 for testing data packet signal transceivers, e.g., such as those used in many wireless communications systems, includes test equipment 12 (e.g., a vector signal generator (VSG) and a vector signal analyzer (VSA)), a device under test (DUT) 14 and a controller (e.g., a computer) 15, interconnected substantially as shown. As discussed in the patent cited hereinabove, the DUT 14 has a number of embedded sub-systems (not shown), including a host processor, memory, a wireless transceiver and one or more peripheral devices, with the memory used to store programs, e.g., as firm ware, to be used by the DUT 14.

The controller 15 generally runs the production test software that controls the test equipment 12 and DUT 14 through external interface connections 15a, 15b, e.g., a universal serial bus (USB), serial peripheral interface (SPI), RS-232 serial interface, etc. Additionally, the test equipment 12 may be controlled through additional interface connections, such as a general purpose interface bus (GPIB) or Ethernet. Alternatively, the controller 15 can be incorporated as part of the test equipment 12 so as to form, at least in a functional sense, as a single unit. The test equipment 12 and DUT 14 communicate via a signal interface 13 which can be a wireless interface, but for production testing purposes is usually a wired interface.

As discussed in the patent cited hereinabove, communication between the controller 15 and DUT 14 via their signal interface 15b can be minimized by having the test equipment 12 and DUT 14 operate in accordance with pre-defined sequences of testing events, thereby allowing the intended test results to be obtained. For example, synchronization is established to ensure that the test equipment 12 and DUT 14 are synchronized, i.e., at the same point within a predetermined test sequence. Following that, testing e.g., for packet error rate (PER), is performed by the test equipment 12 sending packets until a predefined number of packets have been correctly received by the DUT 14, as confirmed by the number of acknowledgement signals (ACK) returned by the DUT 14 to the test equipment 12. In some instances, however, the DUT 14 may not receive a transmitted data packet, and as a result, will not know how many packets the test equipment 12 has transmitted, and will not know when to terminate the test sequence.

Figure 2:
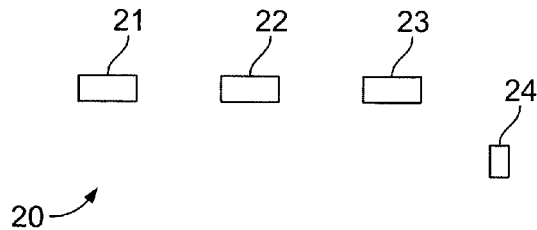
FIG. 2 depicts a conventional synchronization (SYNC) event.

Referring to FIG. 2, a typical synchronization event includes the test equipment 12 transmitting data packets 21, 22, 23. Initially, as the first data packet 21 is transmitted, the DUT 14 is not yet ready. Accordingly, the test equipment 12 times out and transmits another data packet 22. Again, if the DUT 14 is not yet ready, the test equipment 12 times out and transmits another data packet 23. At this point, the DUT 14 now ready, transmits, in return, a data packet 24. In the case of IEEE 802.11 system, this would be an automatically generated ACK.

In those cases where the DUT 14 is ready upon receipt of the first data packet 21, it would reply immediately with an ACK 24. In either event, following synchronization, the agreed test sequence will then be performed. Multiple synchronization events may be necessary during the complete test sequence.

Figure 3:
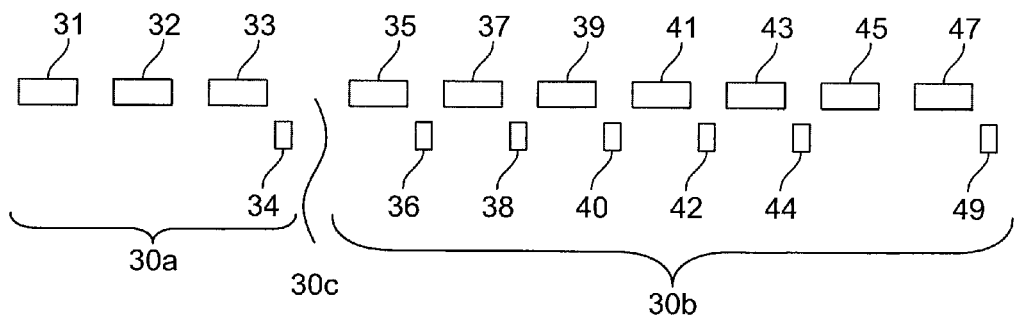
FIG. 3 depicts a conventional problem that can occur with synchronization followed by a signal reception test.

Referring to FIG. 3, the synchronization event 30a is followed by a receive test sequence 30b. The synchronization sequence 30a is as discussed above (FIG. 2), with the test equipment 12 transmitting data packets 31, 32, 33 until the DUT 14 is ready, following which it returns an ACK 34. The transmitted data packets 31, 32, 33 use a MAC address identical to the MAC address of the DUT 14.

Following this acknowledgement 34, the test equipment 12 and DUT 14 take some time 30c to prepare for the actual testing, following which, the test equipment 12 is ready and transmits its first data packet 35. The DUT, also ready, is in the receive mode (e.g., because it was already in receive mode during the synchronization sequence), so it responds with an acknowledgement packet 36. Subsequent transmitted data packets 37, 39, 41 result in corresponding acknowledgement packets 38, 40, 42.

However, up until now, the DUT 14 has not recognized the actual packets being received but has automatically generated the acknowledgment of each one. At some point in this sequence, e.g., when the test equipment 12 transmits the next data packet 43, the DUT 14 is now ready to receive and recognizes the next transmitted packet 43 as a good packet. However, the next packet 45 thereafter is not recognized by the DUT 14 as a good packet, so no ACK is generated in response. Accordingly, the DUT 14 does not respond to this data packet 45, so the test equipment 12 times out and transmits another data packet 47 which results in another acknowledgement 49. As of this point in time, the test equipment 12 now thinks the DUT 14 has received six data packets, based on the six return acknowledgements 36, 38, 40, 42, 44, 49 generated by the DUT 14. However, the DUT 14 is only aware of two data packets 45, 47 having been received. As a result, if the test sequence was defined as the transmission and reception of six data packets by the test equipment 12 and DUT 14, respectively, the test instrument 12 will proceed to the next portion of the testing sequence, but the DUT 14 will not as it awaits an additional four data packets to arrive. As a result, the test equipment 12 and DUT 14 are no longer synchronized and testing will not proceed as intended.

Figure 4:
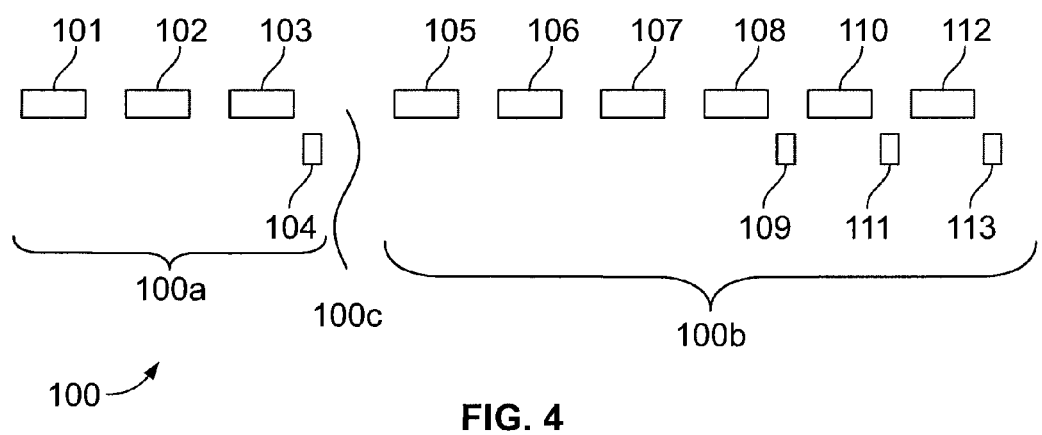
FIG. 4 depicts the establishment and maintenance of synchronization of the DUT and tester in accordance with one embodiment of the presently claimed invention.

Referring to FIG. 4, in accordance with the presently claimed invention, missed data packets or unprepared DUTs can be avoided. Rather than using the same MAC address for the DUT 14, separate MAC addresses are used for the synchronization and testing sequences. For example, for the synchronization sequence, the DUT 14 will respond using MAC address X, while for the receive test sequence, the DUT 14 will use MAC address Y. The test equipment 12 can easily alternate between two MAC addresses at the necessary points in time.

For example, the test equipment 12 transmits a first data packet 101 with MAC address X as the target address. The DUT 14, not ready, fails to return an acknowledgment. The test equipment 12 then transmits a second data pack 102. Again, not ready, the DUT 14 fails to return an acknowledgment. The test equipment 12 transmits a third data packet 103. The DUT 14, now ready and programmed to respond to MAC address X, responds with an acknowledgment 104.

Following that, during a brief time interval, 100c, the test equipment 12 and DUT 14 prepare for the receive test 100b. The test equipment 12 begins transmitting data packets 105, 106, 107 using MAC address Y as the target address. However, the DUT 14 is not yet ready and fails to return acknowledgments. After timing out, the test equipment 12 transmits another data packet 108 and the DUT 14, now ready and programmed to respond to MAC address Y, returns an acknowledgment 109, indicating the readiness of the DUT 14 for the receive tests. As a result, the test equipment 12 knows to ignore the previous packet transmitted as being part of the test, e.g., PER calculation, because the DUT 14 was not ready. Consequently, the test equipment 12 can transmit more data packets 110, 112 to perform the receive test based on the corresponding acknowledgments 111, 113. The test equipment 12 can ignore the first acknowledgement 109 and treat it as indicative of re-synchronization, or it can count it as part of the receive test.

Figure 5:
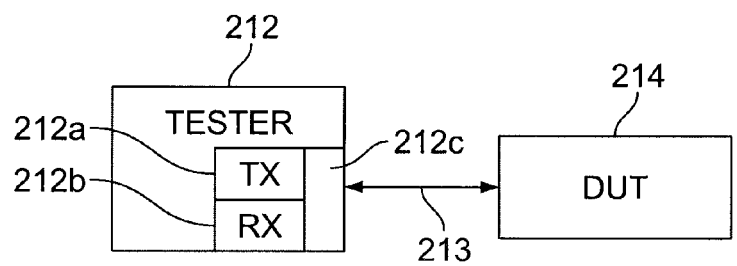
FIG. 5 depicts a tester for testing a DUT in accordance with another embodiment of the presently claimed invention.

Referring to FIG. 5, in accordance with one embodiment of the presently claimed invention, the test equipment 12 includes a tester 212 having a transmitter sub-system (e.g., a VSG) 212a, a receiver sub-system (e.g., a VSA) 212b and signal routing circuitry 212c (e.g., switch, multiplexor, or diplexor) for routing the transmit and receive signals conveyed by the signal interface 213 with the DUT 214.

Figure 6:
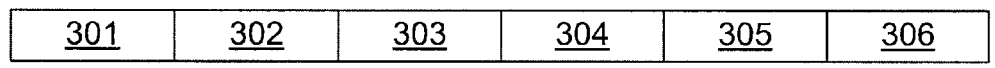
FIG. 6 depicts a media access control (MAC) address packet.

Referring to FIG. 6, as is well known in the art, a MAC address 300 includes six bytes, each of which provides one octet of the address. Generally, the first three bytes 301, 302, 303 form the organizationally unique identifier assigned to a device by its manufacturer. The remaining three bytes 304, 305, 306 form the network interface controller (NIC) address. It is these last three bytes 304, 305, 306 that would likely be altered to provide the multiple MAC address in accordance with the presently claimed invention.

Figure 7A:
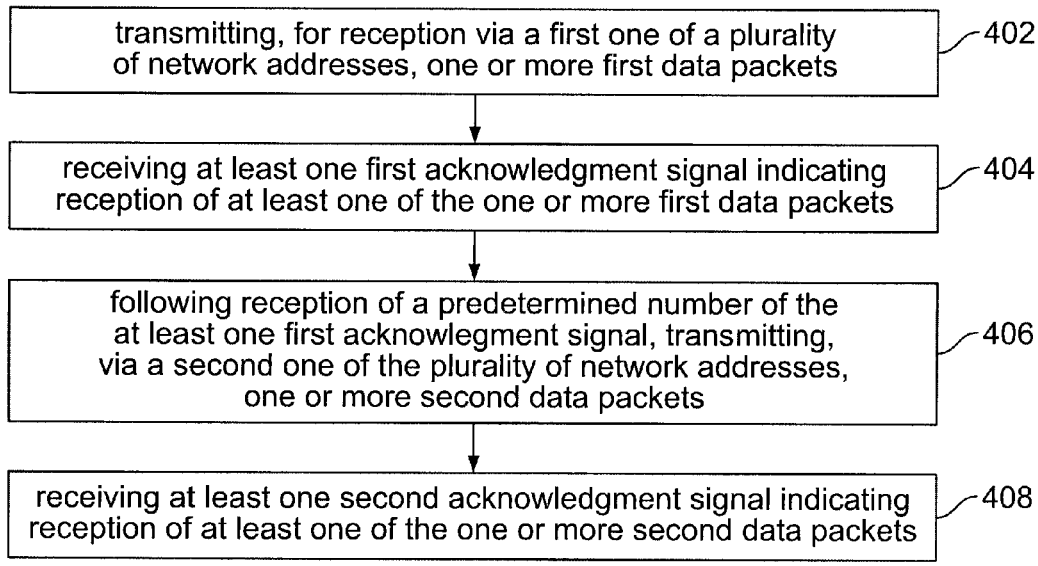
FIGS. 7A and 7B are state-flow diagrams depicting operations of the tester and DUT, respectively, in accordance with further embodiments of the presently claimed invention.

Referring to FIG. 7A, the sequence of events 400 associated with operation of the test equipment 12 can be depicted as shown. First, one or more first data packets are transmitted 402 for reception via a first one of multiple network addresses. Following this, at least one first acknowledgement signal is received 404 indicating reception of at least one of the first data packets. Following reception of a predetermined number of the first acknowledgement signal, one or more second data packets are transmitted 406 via a second one of the multiple network addresses. Following this, at least one second acknowledgement signal is received 408 indicating reception of at least one of the second data packets.

Figure 7B:
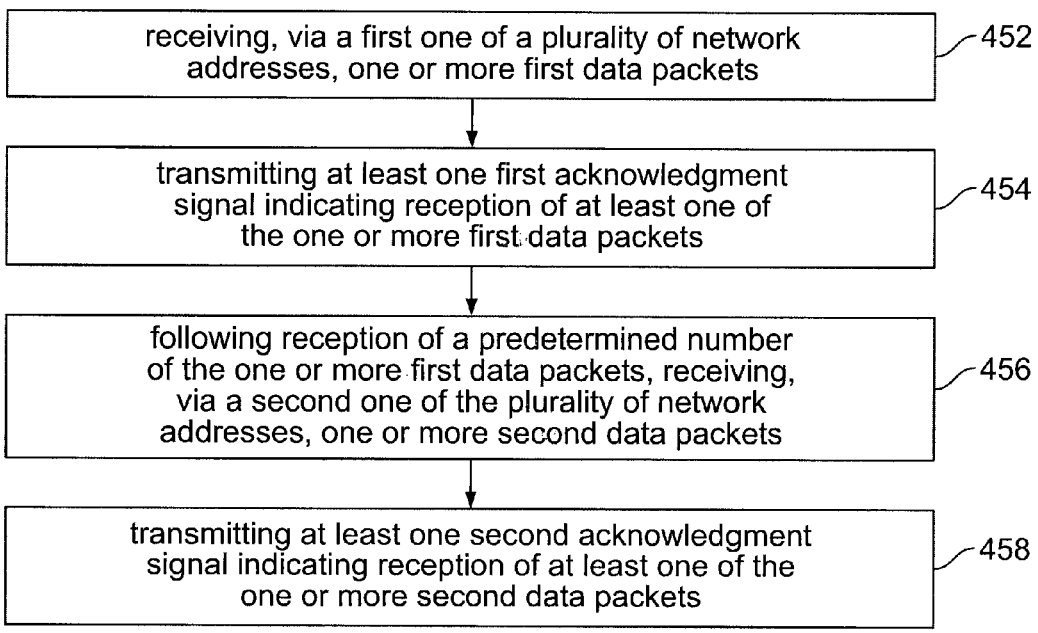

Referring to FIG. 7B, in accordance with another embodiment of the presently claimed invention, a sequence of events performed by the DUT 214 can be depicted as shown. First, one or more first data packets are received 452 via a first one of multiple network addresses. Responsive to this, at least one first acknowledgement signal is transmitted 454 indicating reception of at least one of the first data packets. Following reception of a predetermined number of the first data packets, one or more second data packets are received 456 via a second one of the multiple network addresses. Responsive to this, at least one second acknowledgement signal is transmitted 458 indicating reception of at least one of the second data packets.

Figures 8A, 8B:
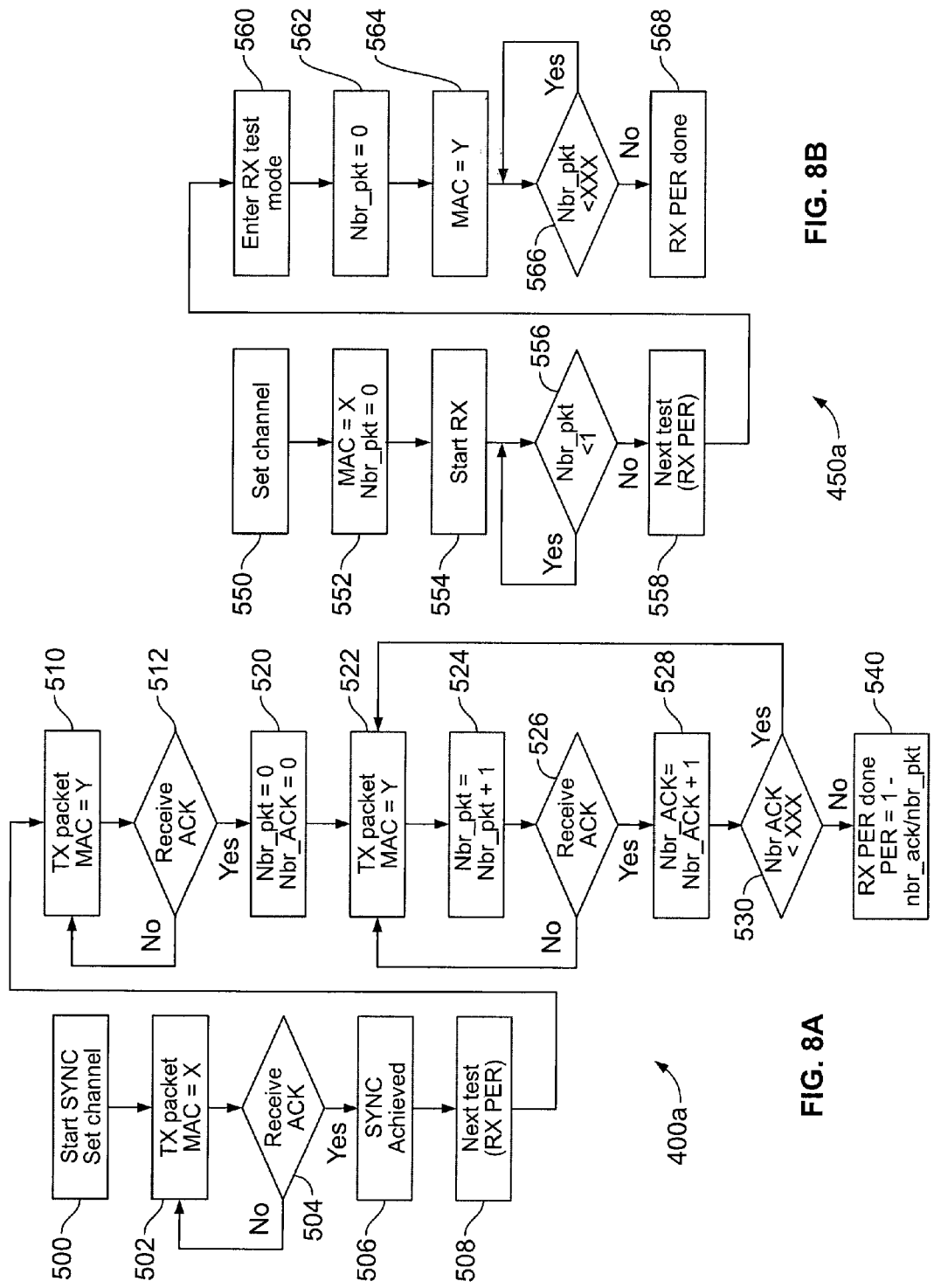
FIGS. 8A and 8B are additional state-flow diagrams depicting operations of the tester and DUT, respectively, in accordance with further embodiments of the presently claimed invention.

Referring to FIGS. 8A and 8B, in accordance with further embodiments of the presently claimed invention, more detailed sequences of events 400a, 450a performed by the tester 212 and DUT 214 can be depicted as shown. First, synchronization is performed on a predefined channel 500. The tester 212 then begins transmitting data packets 502 to the DUT 214 using a target MAC address X. If no acknowledgement is received 504, another data packet is transmitted 502. If an acknowledgement is received 504, then synchronization has been achieved 506. Alternatively, it could be required that more than one acknowledgement is required before synchronization is considered complete.

Meanwhile, the DUT 214 sets the channel at which it is to achieve synchronization 550, enables its receiver 552 to respond via MAC address X, and begins receiving data packets 554. As the acknowledgement is automatically generated, the DUT 214 will operate in this manner until the number of packets received is greater than or equal to that which is needed for synchronization 556, e.g., one in this example. Following this, it will begin executing the next test 558 in the sequence, e.g., a receive PER test in this example.

Meanwhile, the receive test to be performed following synchronization originates from the tester 212. Such test uses a different target MAC address so the transmitted data packet is changed 510 to include the new MAC target address Y, and the tester transmits data packets until an acknowledgement is received 512. Once an acknowledgement is received 520, the data packet and acknowledgement counters are reset 520. In this example, both numbers of packets are reset to zero. Alternatively, one packet has already been received so they could be reset to one. However, if a robust packet is used for the initial packet to ensure reception, the packet counters should be reset to zero as the initial packet may not be at the same level or use the same modulation as the desired receive test.

After resetting the counters 520, a data packet is transmitted 522, again with the new MAC address Y. This packet should be the one specified for the desired receive test. The data packet counter is then incremented 524. If no acknowledgement is received 526, the test flow goes back for transmission of another data packet 522. If an acknowledgement was received in response to the data packet 526, the acknowledgement packet counter is incremented 528. If the total number of received acknowledgements is less than the specified number XXX of acknowledgements 530, the flow goes back for transmission of another data packet 522. If the number of acknowledgements received is equal to the specified number, the test can be ended 540 and the test terminated, e.g., the PER can be calculated as the difference between one and the ratio of acknowledgements to transmitted data packets.

As will be readily appreciated by one of ordinary skill in the art, as part of the testing sequence, signal power levels and modulation can be changed during the process of transmitting new data packets 522, so long as the MAC address remains the same. One would just need to keep track of the different data packet types and their corresponding acknowledgements. Doing this allows testing of multiple data rates within a single test sequence. For example, it could be specified that the DUT 214 must receive 400 packets with four different data rates at different input signal levels, with 100 acknowledgements for each packet type. Once reaching the end of the receive test 540, the tester 212 will proceed to the next test item within a predefined test sequence.

Contemporaneous with the flow in the tester 212, the DUT 214 continues its part of the flow after synchronization has been achieved. The DUT 214 enters receive test mode 560, resets its data packet counter 562 (which counts the number of correctly received data packets that have generated an acknowledgement), and changes it MAC address 564 to address Y. The DUT 214 now begins receiving data packets using MAC address Y until the specified number XXX of packets have been received 566, following which the receive test is complete 568, and the DUT 214 will continue to the next test item or another predefined test sequence.

It will be readily appreciated by one of ordinary skill in the art that such combination of testing steps 400*a*, 450*a* are merely examples, with many other combinations possible in accordance with the presently claimed invention, the primary intent being to allow the tester 212 and DUT 214 to identify when both are ready for testing and to prevent treating one type of packet as the other, e.g., treating synchronization packets as part of the receive test. This will prevent the tester 212 and DUT 214 from losing synchronization notwithstanding enablement of the DUT receiver and its operation without being fully synchronized with execution of the DUT software. For example, in the event that the DUT software has a delay to detect the correct number of packets that have been received, the tester 212 can stop sending data packets, since it knows that the DUT 214 has received the predefined number of packets.

It will be further appreciated that additional functions can be implemented, e.g., using a special packet for synchronization and a different packet for receive test. For example, the receive test packets can be used to test modulation, data contents, etc. In all instances, using the MAC address as discussed above will have minimal impact on existing DUT software, since it is already a supported function in the DUT software.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a data packet signal transceiver, comprising:
   receiving, with a data packet signal transceiver via a first one of a plurality of network addresses, one or more first data packets, wherein said data packet signal transceiver is adapted to communicate via said plurality of network addresses;
   transmitting, with said data packet signal transceiver, at least one first acknowledgment signal indicating reception of at least one of said one or more first data packets;
   following reception with said data packet signal transceiver of a predetermined number of said one or more first data packets, receiving, with said data packet signal transceiver via a second one of said plurality of network addresses, one or more second data packets; and
   transmitting with said data packet signal transceiver at least one second acknowledgment signal indicating reception of at least one of said one or more second data packets.

2. The method of claim 1, wherein said plurality of network addresses comprises a plurality of media access control (MAC) addresses.

3. The method of claim 1, wherein said one or more first data packets comprises one or more synchronization data packets.

4. The method of claim 1, wherein said one or more second data packets comprises one or more test data packets.

5. The method of claim 1, further comprising resetting a data packet counter prior to said reception of said one or more first data packets.

6. The method of claim 1, further comprising resetting a data packet counter following said reception of a predetermined number of said one or more first data packets.

7. The method of claim 1, further comprising, following said transmitting of said at least one first acknowledgment signal, setting said network address to said second one of said plurality of network addresses.

8. The method of claim 1, further comprising, following said reception of said predetermined number of said one or more first data packets, setting said network address to said second one of said plurality of network addresses.

9. The method of claim 1, further comprising, following said transmitting of said at least one first acknowledgment signal and prior to said receiving of said one or more second data packets, disabling said first one of said plurality of network addresses and enabling said second one of said plurality of network addresses.

10. The method of claim 1, wherein said at least one second acknowledgment signal is different from said at least one first acknowledgment signal.

11. A method of testing of a data packet signal transceiver, comprising:
    transmitting, for reception by a data packet signal transceiver via a first one of a plurality of network addresses, one or more first data packets, wherein said data packet signal transceiver is adapted to communicate via said plurality of network addresses;
    receiving, from said data packet signal transceiver, at least one first acknowledgment signal indicating reception of at least one of said one or more first data packets;
    following reception of a predetermined number of said at least one first acknowledgment signal, transmitting, for reception by said data packet signal transceiver via a second one of said plurality of network addresses, one or more second data packets; and
    receiving, from said data packet signal transceiver, at least one second acknowledgment signal indicating reception of at least one of said one or more second data packets.

12. The method of claim 11, wherein said plurality of network addresses comprises a plurality of media access control (MAC) addresses.

13. The method of claim 11, wherein said one or more first data packets comprises one or more synchronization data packets.

14. The method of claim 11, wherein said one or more second data packets comprises one or more test data packets.

15. The method of claim 11, further comprising resetting an acknowledgment counter following said reception of said at least one first acknowledgment signal.

16. The method of claim 11, further comprising incrementing a data packet counter following said transmission of said one or more second data packets.

17. The method of claim 11, further comprising incrementing an acknowledgment counter following said reception of said at least one second acknowledgment signal.

18. The method of claim 11, further comprising, following said reception of said at least one second acknowledgment signal, transmitting, for reception by said data packet signal transceiver via said second one of said plurality of network addresses, one or more additional ones of said one or more second data packets.

19. The method of claim 18, further comprising incrementing a data packet counter following said transmission of each of said one or more additional ones of said one or more second data packets.

20. The method of claim 18, further comprising receiving, from said data packet signal transceiver, one or more additional ones of said at least one second acknowledgment signal indicating reception of a corresponding one or more of said one or more additional ones of said one or more second data packets.

21. The method of claim 20, further comprising incrementing an acknowledgment counter following said reception of said at least one second acknowledgment signal.

22. The method of claim 11, wherein said at least one second acknowledgment signal is different from said at least one first acknowledgment signal.

23. An apparatus including a tester for testing a data packet signal transceiver, comprising:
    a transmitter for
        transmitting, for reception by a data packet signal transceiver via a first one of a plurality of network addresses, one or more first data packets, wherein said data packet signal transceiver is adapted to communicate via said plurality of network addresses, and
        following reception, from said data packet signal transceiver, of a predetermined number of at least one first acknowledgment signal, transmitting, for reception by said data packet signal transceiver via a second one of said plurality of network addresses, one or more second data packets; and
    a receiver for
        receiving said at least one first acknowledgment signal indicating reception of at least one of said one or more first data packets, and
        receiving, from said data packet signal transceiver, at least one second acknowledgment signal indicating reception of at least one of said one or more second data packets.

24. The apparatus of claim 23, wherein said plurality of network addresses comprises a plurality of media access control (MAC) addresses.

25. The apparatus of claim 23, wherein said one or more first data packets comprises one or more synchronization data packets.

26. The apparatus of claim 23, wherein said one or more second data packets comprises one or more test data packets.

27. The apparatus of claim 23, further comprising an acknowledgment counter for resetting following said reception of said at least one first acknowledgment signal.

28. The apparatus of claim 23, further comprising a data packet counter for incrementing following said transmission of said one or more second data packets.

29. The apparatus of claim 23, further comprising an acknowledgment counter for incrementing following said reception of said at least one second acknowledgment signal.

30. The apparatus of claim 23, wherein said transmitter is further for transmitting, following said reception of said at least one second acknowledgment signal and for reception by said data packet signal transceiver via said second one of said plurality of network addresses, one or more additional ones of said one or more second data packets.

31. The apparatus of claim 30, further comprising a data packet counter for incrementing following said transmission of each of said one or more additional ones of said one or more second data packets.

32. The apparatus of claim 30, said receiver is further for receiving, from said data packet signal transceiver, one or more additional ones of said at least one second acknowledgment signal indicating reception of a corresponding one or more of said one or more additional ones of said one or more second data packets.

33. The apparatus of claim 32, further comprising an acknowledgment counter for incrementing following said reception of said at least one second acknowledgment signal.

34. The apparatus of claim 23, wherein said at least one second acknowledgment signal is different from said at least one first acknowledgment signal.

* * * * *